Patented May 9, 1944

2,348,702

UNITED STATES PATENT OFFICE 2,348,702

HYDROGENATION OF HYDROCARBON MATERIALS

Louis Schmerling and Vladimir N. Ipatieff, Chicago, Ill., assignors to Universal Oil Products Company, Chicago, Ill., a corporation of Delaware No Drawing. Application September 26, 1941, Serial No. 412,464

6 Claims. (Cl. 196—53)

This invention relates particularly to the hydrogenation of liquid mixtures of hydrocarbons in the presence of specific catalysts to produce lower boiling hydrocarbons whose chemical nature depends upon the nature of the charging stock.

The invention is more specifically concerned with the use of particular catalysts and conditions of operation, whereby the heavier fractions of petroleum and similar hydrocarbonaceous materials, such as coal and shale tars, may be converted into low-boiling hydrocarbon fractions of motor fuel boiling range or mixtures of low-boiling aromatic hydrocarbons, such as benzene, toluene and xylenes.

It is recognized that the art of destructive hydrogenation is rather extensive and that it was originally applied to solid hydrocarbonaceous materials such as coals of different grades to produces liquid hydrocarbons therefrom, in some instances lubricating oils and in other instances lighter oils such as kerosene and motor fuels. The processes first used operated at relatively high superatmospheric pressures of hydrogen without catalysts, but later developments indicated the feasibility of utilizing sulf-active catalysts which would maintain their activity over extended periods of time and also the practicability of utilizing as charging stocks suspensions of finely ground coal in heavy oils. The types of catalysts employed most often in commercial destructive hydrogenation processes are oxides and sulfides of the heavy metals and particularly oxides and sulfides of the metals in the left-hand column of group 6 of the periodic table. The present process is a development on the art of destructive hydrogenation as applied to normally liquid hydrocarbon mixtures.

One specific embodiment of the present invention comprises a process for the production of lower boiling hydrocarbons from higher boiling hydrocarbon mixtures which consists in subjecting said higher boiling hydrocarbon mixtures to contact with hydrogen in the presence of catalysts comprising essentially magnesium chloride.

The catalysts which characterize the present process may consist of substantially anhydrous magnesium chloride in granular or powdered form or composite materials made by impregnating miscellaneous granular supports with aqueous solutions of magnesium chloride or of magnesium chloride hexahydrate, the latter compound melting with decomposition at 118° C. When the magnesium chloride solutions retained on the supports are evaporated, some hydrolysis of the magnesium salt occurs so that the resultant catalytic material comprises, in addition to magnesium chloride, certain amounts of magnesium hydroxy chloride and magnesium oxide. Owing to the variations in composition between anhydrous magnesium chloride and the magnesium oxide resulting from hydrolysis, catalysts of varying activity, applicable to the destructive hydrogenation of different charges, are producible so that the process in this respect has a definite degree of flexibility.

The types of supporting materials which can be used in the preparation of the composite catalysts include such materials as prepared alumina, aluminum oxide minerals, such as bauxite and gibbsite, certain types of naturally occurring silicas, such as kieselguhr and diatomaceous and infusorial earths, clays including particularly the kaolin groups which comprise kaolin, pyrophyllite, montmorillonite, etc. In addition to these types of carriers, artificially produced forms of silicates and silica-alumina composites may be used and also forms of granular activated charcoal. Particularly good results have been obtained when utilizing granular catalysts prepared by impregnating the so-called activated aluminas with solutions of magnesium chloride and later evaporating to remove water and produce a limited amount of hydrolysis.

As a further feature of the invention the catalytic activity of the preferred catalyst may be increased by the use of minor amounts of hydrogen chloride or compounds such as nitrosyl chloride, although the use of these promoting substances is optional and not always necessary.

In applying the process of the invention to the production of low-boiling hydrocarbons from relatively heavy hydrocarbon oil mixtures, such as the heavy distillate or residual fractions of petroleum, the simplest method of operation consists in charging the heavy oil with a suitable amount of granular or powdered catalyst into a pressure vessel, adding hydrogen to produce an initial pressure corresponding to the hydrogen necessary for effecting the desired hydrogenation reaction, and then heating the pressure vessel contents to a suitable temperature which is maintained constant until the reactions are completed. Depending upon the type of charge and the extent of conversion desired, temperatures from about 100 to 600° C., and initial pressures of hydrogen of from about 1 to about 100 atmospheres may be used. As a rule the temperatures used are more frequently within the narrower range of from about 350 to about 450° C., and the initial hydrogen pressures of from about 50 to about 100 atmospheres. In batch runs there will be an increase in pressure as the pressure vessel contents are heated.

In some cases better results may be obtained if the hydrogen is added stepwise instead of adding the total amount at the beginning of the run.

Continuous operations may be conducted by passing a mixture of heavy oil and hydrogen in regulated proportions through a bed of granular catalyst contained in a tubular reactor which is maintained at a relatively constant temperature. In such cases the hydrogen and the oil may be preheated to the desired reaction temperature which is maintained in the reactor by abstracting the heat of reaction by means of cooling fluids which are caused to pass around the reactor tubes.

The present types of catalysts are relatively cheap when their original cost and their active life is considered and, as a rule, may be discarded after their activity has dropped below a practical point. They are not affected by sulfur in the concentrations usually encountered in heavy petroleum fractions and they therefore possess a somewhat longer life in comparison with the types of metal oxide and metal sulfide catalysts previously used for the present types of reactions.

The following example of the preparation and use of a catalyst of the present type is given for illustrative purposes to indicate the type of results obtainable by the application of the present process, but with no intention of correspondingly limiting the proper scope of the invention.

200 parts by weight of pills of calcined alumina were impregnated with a solution obtained by dissolving 142 parts by weight of magnesium chloride hexahydrate in 70 parts by weight of water. The solution was added in 3 portions with intermediate drying at 100° C., the completely impregnated pills being finally dried in an oven at 100° C. at 8 hours and then at 350° C. for 9 hours. An analysis of the magnesium and chloride content of the catalyst, thus prepared, indicated that the materials, other than alumina, consisted of about ⅔ magnesium oxide and ⅓ of a mixture of about equal parts of anhydrous magnesium chloride and magnesium hydroxy chloride.

The above catalyst was used in the destructive hydrogenation of a paraffinic gas oil fraction from the Appalachian producing area. One hundred parts by weight of the gas oil and 15 parts by weight of the prepared catalyst were placed in a pressure vessel and hydrogen was added to an initial pressure of 100 atmospheres. The vessel contents were then heated to a temperature of 400° C., at which temperature the intial pressure was 220 atmospheres. The vessel was maintained at the reaction temperature for a period of six hours after which it was cooled and the pressure released and the liquid products recovered. The reaction product consisted of 2 parts by weight of gas condensible at $-78°$ C., 4 parts by weight of gases non-condensible at this temperature, and 90 parts by weight of a liquid product which contained 28.5% of materials boiling below 300° F. and 44% of liquid boiling below 400° F.

A similar run made with the unimpregnated alumina support yielded no considerable gas and 91 parts by weight of liquid which contained only 8% of 300° F. end-point material and 15% of 400° F. end-point material.

We claim as our invention:

1. A process for converting normally liquid hydrocarbon mixtures into lower boiling products which comprises subjecting the hydrocarbons to destructive hydrogenation under substantial hydrogen pressure and in the presence of a solid catalyst comprising magnesium oxide and substantially anhydrous magnesium chloride.

2. A process for converting normally liquid hydrocarbon mixtures into lower boiling products which comprises subjecting the hydrocarbons to destructive hydrogenation under substantial hydrogen pressure and in the presence of a solid catalyst comprising a relatively inert granular material supporting substantially anhydrous magnesium chloride and magnesium oxide.

3. A process for converting normally liquid hydrocarbon mixtures into lower boiling products which comprises subjecting the hydrocarbons to destructive hydrogenation under substantial hydrogen pressure and in the presence of a solid catalyst comprising a relatively inert granular material supporting substantially anhydrous magnesium chloride, magnesium hydroxy chloride and magnesium oxide.

4. A process for converting normally liquid hydrocarbon mixtures into lower boiling products which comprises subjecting the hydrocarbons to destructive hydrogenation under substantial hydrogen pressure and in the presence of magnesium oxide, substantially anhydrous magnesium chloride and hydrogen chloride.

5. The process as defined in claim 2 further characterized in that the destructive hydrogenation is effected in the presence of hydrogen chloride.

6. The process as defined in claim 3 further characterized in that the destructive hydrogenation is effected in the presence of hydrogen chloride.

LOUIS SCHMERLING.
VLADIMIR N. IPATIEFF.